United States Patent [19]
Swarup et al.

[11] Patent Number: 5,854,332
[45] Date of Patent: *Dec. 29, 1998

[54] AQUEOUS URETHANE/ACRYLIC RESINS WITH BRANCHED CHAIN EXTENSION AND COATING COMPOSITIONS MADE THEREFROM

[75] Inventors: Shanti Swarup, Hampton Township, Allegheny County; Anbazhagan Natesh, Horsham Township, Montgomery County; Norene E. Fortuna, Fawn Township, Allegheny County; Kurt G. Olson, Allegheny County, all of Pa.

[73] Assignee: PPG Industries, Inc., Pittsburgh, Pa.

[*] Notice: The term of this patent shall not extend beyond the expiration date of Pat. No. 5

[21] Appl. No.: 771,194

[22] Filed: Dec. 20, 1996

[51] Int. Cl.⁶ .................. C08J 3/05; C08J 3/03; C08L 75/04; C09D 175/04

[52] U.S. Cl. .......... 524/507; 524/501; 524/591; 524/840; 525/123; 525/127; 525/128; 525/130; 525/131; 525/454; 525/455; 528/71

[58] Field of Search .................... 524/501, 507, 524/591, 84; 525/123, 127, 128, 130, 131, 454, 455; 528/71

[56] References Cited

U.S. PATENT DOCUMENTS

| | | | |
|---|---|---|---|
| 3,684,759 | 8/1972 | Reiff et al. | 524/507 |
| 3,705,164 | 12/1972 | Honig et al. | 524/591 |
| 4,198,330 | 4/1980 | Kaizerman et al. | 523/501 |
| 4,318,833 | 3/1982 | Gaugliardo | 524/457 |
| 4,335,029 | 6/1982 | Dabi et al. | 524/589 |
| 4,533,254 | 8/1985 | Cook et al. | 366/176 |
| 4,644,030 | 2/1987 | Loewrigkeit et al. | 524/457 |
| 4,791,168 | 12/1988 | Salatin et al. | 524/601 |
| 4,927,868 | 5/1990 | Schimmel et al. | 523/439 |
| 5,071,904 | 12/1991 | Martin et al. | 524/458 |
| 5,118,752 | 6/1992 | Chang et al. | 524/521 |
| 5,155,163 | 10/1992 | Abeywardena et al. | 524/591 |
| 5,173,526 | 12/1992 | Vijayendran et al. | 524/457 |
| 5,268,397 | 12/1993 | Larson | 525/454 |
| 5,354,807 | 10/1994 | Dochniak | 524/591 |
| 5,459,197 | 10/1995 | Schwindt et al. | 524/591 |
| 5,554,686 | 9/1996 | Frinch, Jr. et al. | 524/588 |
| 5,614,584 | 3/1997 | Schwan et al. | 524/591 |
| 5,728,769 | 3/1998 | Natesh et al. | 524/591 |
| 5,739,194 | 4/1998 | Natesh et al. | 524/457 |

FOREIGN PATENT DOCUMENTS 0 308 115  3/1989  European Pat. Off. .

*Primary Examiner*—Rabon Sergent
*Attorney, Agent, or Firm*—Kenneth J. Stachel; Dennis G. Millman

[57] ABSTRACT

Aqueous dispersions of urethane polymers and vinyl polymers (e.g., acrylics) that provide water-based coating compositions with good adhesion following humidity exposure are further improved by providing branching chain extension of the polyurethane. The branched polymers provide improved metallic pigment orientation in coating compositions. Branching is provided by the use of chain extending agents selected from polyamines having at least three primary amine groups and polyols having at least three hydroxyl groups. The vinyl monomers are polymerized in the presence of the aqueously dispersed polyurethane.

19 Claims, No Drawings

AQUEOUS URETHANE/ACRYLIC RESINS WITH BRANCHED CHAIN EXTENSION AND COATING COMPOSITIONS MADE THEREFROM

BACKGROUND OF THE INVENTION

The present invention relates to aqueous polymer dispersions comprising polyurethane and vinyl polymers useful in coating compositions.

It was known in the prior art to modify the properties of polyurethanes by incorporating vinyl polymers, particularly acrylic polymers, into a resin. One technique has been to form a water-dispersible polyurethane and then to polymerize vinyl monomers in the presence of the polyurethane as described in the patents cited below. The technique generally includes producing a urethane prepolymer from polyisocyanate, polyol, and a monomer containing acid groups. The prepolymer is neutralized with a tertiary amine, then dispersed in water along with vinyl monomers, typically including acrylic monomers. The vinyl monomers are then polymerized in situ. In some prior art techniques, the dispersed urethane prepolymer is chain extended after dispersion in water and prior to polymerization of the vinyl monomers, thereby forming a fully reacted polyurethane polymer. The chain extending agents usually are polyamines or polyols, most commonly polyalkyl polyamines having a combination of primary and secondary amine groups. Linear chain extension has been preferred in the prior art, thus favoring the use of polyamines having no more than two primary amine groups.

A particular problem encountered with at least some water-based polyurethane/acrylate coating compositions has been a susceptibility to loss of adhesion when the cured coating is exposed to humid conditions. Waterborne polyurethane and urethane/acrylic resins are disclosed in co-pending, commonly owned U.S. patent application Ser. No. 08/668,901, U.S. Pat. No. 5,728,769; Ser. No. 08/668,069, U.S. Pat. No. 5,739,194; and Ser. No. 08/718,284 that address the humidity resistance problem. Chain extending aqueous urethanes with amines in general is disclosed in these applications. Included among the amines disclosed is a tertiary amine, tris(aminoethyl)amine, but urethane/acrylic resins chain extended with tertiary amines have been found to have the disadvantage of causing discoloration of coatings made therefrom. This is a problem with light colored coatings, particularly white.

In producing water-based polyurethane/vinyl resins for use in coating compositions for automotive applications, it is desirable to achieve a combination of properties including gloss, flexibility, durability, abrasion resistance, and solvent resistance. Additionally, when reflective flake type pigments (e.g. aluminum flake pigments) are included in coating formulations, controlling orientation of the pigment particles is important for achieving an attractive appearance. It would be desirable to provide improved metallic pigment orientation in the humidity resistant coatings of the type disclosed in the co-pending patent applications cited above. A relationship between pigment orientation and chain extension was not recognized in the following prior art patents that deal with similar aqueous urethane/acrylic resins.

U.S. Pat. No. 3,705,164 (Honig et al.) discloses a process for making stable aqueous polymer dispersions by subjecting vinyl monomers to emulsion polymerization in the presence of a stable aqueous dispersion of a polyurethane containing anionic groups. The vinyl monomers disclosed include a variety of alkyl acrylates. Coatings are disclosed as a use of the resulting polymer dispersions.

U.S. Pat. No. 4,198,330 (Kaizerman et al.) discloses modifying an aqueous polyurethane by means of vinyl monomers by a process similar to that of the U.S. Pat. No. 3,705,164 patent. The vinyl monomers are selected from a particular group in order to yield a high glass transition temperature in the polymer.

U.S. Pat. No. 4,644,030 (Loewrigkeit et al.) discloses a method for making an aqueous dispersion of polyurethane by first producing an isocyanate-terminated polyurethane prepolymer in ethylenically unsaturated monomers such as acrylates. The polyurethane prepolymer is then dispersed in water and is chain-extended. Polyamines are disclosed for chain extension, preferably those having two primary amine groups. Thereafter the unsaturated monomer material is polymerized in situ in the aqueous dispersion.

EP-A-0 308 115 discloses an aqueous polymer dispersion containing an anionic water-dispersible polyurethane and a vinyl polymer obtained by a process similar to that of the U.S. Pat. No. 4,644,030.

U.S. Pat. No. 4,318,833 (Guagliardo) discloses a waterborne polyurethane/acrylic in which the acrylic portion is dominant. Chain extension is not disclosed.

U.S. Pat. No. 4,791,168 (Salatin et al.) relates to incorporating polyesters (not acrylics) made from long-chain carboxylic acids into waterborne polyurethane resins. For chain extension, this patent prefers the use of alkylene diamines and diols. Triols such as trimethylolpropane are disclosed as theoretical alternative chain extending agents, but the patent instructs that they should be avoided or at least used in only very limited amounts in the polyurethane polyester resin systems disclosed there.

U.S. Pat. No. 5,118,752 (Chang et al.) discloses aqueous polymerization of vinyl monomers, including acrylates, in the presence of a polymeric surfactant containing urethane groups and silane groups. Among the isocyanates used to make the urethane portion of the surfactant is included a hydrophobic isocyanate ("DDI" diisocyanate). A comparative example without silane groups is also disclosed, but is reported in the patent to perform poorly. All of the examples disclosed in the patent employ a substantially larger amount of vinyl polymer relative to the polyurethane polymer, and the vinyl portion is predominately styrene. Polyamines and polyols in general are disclosed as chain extending agents, but only ethylene diamine is used throughout the examples.

U.S. Pat. No. 5,173,526 (Vijayendran et al.) involves a method for making aqueous polyurethane/acrylics similar to Chang et al., except that no silane groups are included, no hydrophobic isocyanates are used, and the use of an oil-soluble initiator is required. The resulting aqueous polymer dispersion is intended for use in paper coatings. Chain extending agents include amines and polyols in general, preferably diamines. Tris(aminoalkyl)amine is also mentioned, but as noted above, tertiary amines can present discoloration problems.

SUMMARY OF THE INVENTION

It has now been found that in aqueous dispersions of urethane polymers and vinyl polymers, such as acrylic polymers, which provide water-based coating compositions with good humidity resistance, an additional improvement in metallic pigment orientation can be achieved by providing branching of the polyurethane polymer. The improvement is achieved by selection of a chain extending agent that is either a polyamine having at least three primary amine groups or a polyol having at least three hydroxyl groups. The chain extending agent should be substantially free of tertiary amine groups. The formation of branched polyurethane structure may take place during chain extension after the polyurethane prepolymers have been dispersed in water, or it can be achieved during production of the polyurethane prepolymers. Vinyl monomers are polymerized in the presence of the branched polyurethane that has been dispersed in water.

The coating composition of the present invention is particularly useful as a pigmented waterborne basecoat onto which may be applied a clear topcoat, such as a two-component isocyanate coating. When the clear top coat is based on organic solvent-borne resins, the susceptibility of a waterborne basecoat to deterioration due to humidity exposure is particularly critical, and the composition of the present invention is particularly adapted to resist such deterioration as well as provide improved metallic pigment orientation.

DETAILED DESCRIPTION OF THE INVENTION

The aqueous polyurethane/vinyl polymer dispersions may be prepared by forming an isocyanate-terminated polyurethane prepolymer including ion-forming groups sufficient to permit dispersion of the prepolymer in water, adding a vinyl monomer mixture to the prepolymer to make a prepolymer/vinyl monomer mixture, adding a neutralizing agent to the prepolymer/monomer mixture to salify the ion-forming groups, dispersing the prepolymer/monomer mixture in water, adding a chain extender to effect the chain extension of the polyurethane prepolymer, adding a free radical initiator to the aqueous dispersion, and polymerizing the vinyl monomers.

The resins of the present invention are predominately urethane; i.e., the polyurethane/vinyl polymer weight ratio is at least 50 percent polyurethane, preferably greater than 55 percent polyurethane. In order to provide the property of humidity resistance, the polyurethane/vinyl polymer may be synthesized by the technique disclosed in U.S. patent application Ser. No. 08/668,069 (which will be referred herein as "synthesis technique A") or by the technique disclosed in U.S. patent application Ser. No. 08/718,284 (which will be referred herein as "synthesis technique B"). These two approaches are set forth separately hereinafter.

Resin Synthesis Technique A

Characterizing the polyurethane of the this technique is the selection of polyisocyanates from which it is synthesized. A first polyisocyanate is characterized by the presence of at least one linear carbon chain greater than six carbon atoms in length between two isocyanate groups, preferably at least eight carbon atoms in length. For the sake of reduced cost and providing a range of coating properties, this first polyisocyanate may be combined with one or more different polyisocyanates selected from more conventional types used for coatings. Therefore, the first polyisocyanate preferably constitutes a minor portion of the polyisocyanate mixture, e.g., 20% to 50% by weight of the polyisocyanate mixture, although greater amounts are not precluded. The best resistance to water in the cured coatings has been found in embodiments in which the first polyisocyanate constituted at least 25% of the polyisocyanate mixture, preferably at least 30%.

The first polyisocyanate, at least one additional polyisocyanate, an active hydrogen containing compound (e.g., a polyol), and an isocyanate-reactive compound containing a salt-forming group are reacted to form a polyurethane prepolymer, which is then neutralized, dispersed in water, and chain-extended. The first polyisocyanate preferably constitutes at least about 10 weight percent of all the monomers used to make the polyurethane portion of the resin.

The polyurethane prepolymers may be produced by reacting organic material containing an average of at least about two active hydrogen atoms per molecule (usually a diol, typically a polyester polyol) with a stoichiometric excess of a polyisocyanate mixture. Additionally, the reactants for forming the prepolymer include an additional monomer reactive with isocyanate and having a salt-forming group for providing water dispersibility to the prepolymer.

To attain the results of this synthesis technique, it is important that the polyisocyanate prepolymer be made from at least one polyisocyanate having at least one linear chain alkylene group greater than $C_6$ in length between isocyanate groups, preferably at least $C_8$ in length. This first isocyanate may additionally include aliphatic, cycloaliphatic, araliphatic or aromatic segments. It is believed that the presence of the alkylene group contributes to the improved humidity resistance exhibited by the coatings of the present invention. A particular type of polyisocyanate of this type that has been found suitable for use as the first polyisocyanate is characterized by the structure:

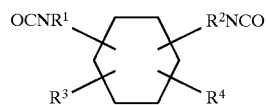

where $R^1$, $R^2$, $R^3$, and $R^4$ may be the same or different, $R^1$ and $R^2$ each contain alkylene groups at least $C_6$ in length (preferably at least $C_8$), and $R^3$ and $R^4$ each are H or an alkyl group. Preferably both of $R^3$ and $R^4$ are alkyl groups. In general, longer alkyl or alkylene groups provide greater hydrophobicity to the prepolymer, which is desirable. Although no upper limit has been identified, alkylene groups longer than $C_{20}$ are uncommon. An example of such a polyisocyanate is "DDI® 1410" diisocyanate available from the Henkel Corporation, which is 2-heptyl-3,4-bis(9-isocyanato nonyl)-1-pentyl-cyclohexane.

Although polyisocyanates of the above-described first type may theoretically be used for the entire isocyanate content of the prepolymer, practical considerations such as cost generally limit them to no more than 50 percent by weight of the isocyanate monomer content. Providing a second polyisocyanate also permits additional attributes to be imparted to the product. In the particular embodiments tested, the advantages of the present invention were not perceptible when the first polyisocyanate was used in amounts less than about 20 percent by weight of the total polyisocyanate mixture. Significant improvements may be obtained when the first polyisocyanate constitutes at least 25 percent of the polyisocyanate mixture, and optimum results were obtained at levels of at least 30 percent. The remainder of the polyisocyanate mixture may constitute a second polyisocyanate of a more conventional type.

Polyisocyanates that may be used as the second polyisocyanate in making the prepolymer may be selected from a wide range of polyisocyanate compounds considered suitable for coating applications. These include aliphatic, cycloaliphatic, araliphatic or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. The second isocyanate may also include mixtures of polyisocyanates.

The polyol component reacted with the polyisocyanates to form the polyurethane prepolymer may be members of any of the chemical classes of polymeric polyols used or proposed to be used in polyurethane formulations. Low molecular weight diols could possibly be used, but it is preferred to use polymeric polyols for at least a portion of the polyol component for the sake of flexibility in the coating. Polymeric polyols having molecular weights in the range of 200–6000 are typical. In particular, the polyols may be polyesters, polyesteramides, polyethers, polythioethers, polycarbonates, polyacetals, polyolefins or polysiloxanes. Polyester polyols are particularly preferred and include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

To provide for water dispersibility, the monomer mixture used to produce the polyurethane prepolymer may include isocyanate-reactive compounds containing salt forming groups. Most conveniently, the polymer is made anionic, whereby the salt-forming group may be a carboxylic acid group which can subsequently be neutralized to salt form. In that case, the monomer can be a polyol having a carboxylic acid group. These include carboxy group containing diols and triols, for example dihydroxyalkanoic acids of the formula

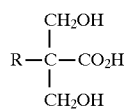

wherein R is hydrogen or a $C_1$–$C_{10}$ alkyl group. Specific examples of isocyanate-reactive acids include 2,2-di(hydroxymethyl)acetic acid, 2,2,2-tri(hydroxymethyl)acetic acid, 2,2-di(hydroxymethyl)butyric acid, 2,2-di(hydroxymethyl)pentanoic acid, and the like. The preferred carboxy-containing diol is 2,2-di(hydroxymethyl)propionic acid. If desired, the carboxy-containing diol or triol may be incorporated into a polyester by reaction with a dicarboxylic acid before being incorporated into the prepolymer. The concentration of salt-forming groups is chosen so as to provide stability to the aqueous dispersion of the prepolymer in water. This will vary in accordance with the hydrophobicity of the particular polymer. For the best results, the acid number for the final polyurethane/acrylic dispersion may be in the range of 1 to 125 milligrams KOH per gram of polymer solids, preferably 20 to 100.

The anionic, water-dispersible, isocyanate-terminated polyurethane prepolymer may be prepared in conventional manner by reacting a stoichiometric excess of the polyisocyanates with the polymeric polyols under substantially anhydrous conditions at a temperature between about 30° C. and 130° C. until the reaction between the isocyanate groups and the hydroxyl groups is substantially complete. The polyisocyanate and the polyol components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

Resin Synthesis Technique B

In this approach, the urethane prepolymers may be produced by reacting a stoichiometric excess of a polyisocyanate with specialized polyhydroxy compounds. As in technique A, the reactants for forming the prepolymer include an additional monomer reactive with isocyanate and having a salt-forming group for providing water dispersibility to the prepolymer. Other polyols reactive with isocyanate may also be included.

To attain the results of this technique, it is important that the polyhydroxy compounds used to form the urethane prepolymer contain a hydrocarbon group greater than $C_6$ in length, preferably at least $C_8$ in length. This polyhydroxy compound may additionally include aliphatic, cycloaliphatic, araliphatic or aromatic segments. It is believed that the presence of relatively large hydrocarbon groups in the polyhydroxy compound contributes to the improved humidity resistance exhibited by the coatings of the present invention. The presence of a plurality of hydrocarbon groups at least $C_6$ in length appears to be helpful, and the presence of cycloaliphatic groups also appears to have a positive effect. The polyhydroxy compounds are the reaction product of an acid and an epoxy compound or a polyol, at least one of which is polyfunctional. Preferably a diacid is reacted with a monoepoxy compound to yield a compound having two hydroxyl groups which may then be reacted with polyisocyanates to produce urethane prepolymers. The desired hydrocarbon groups may be contributed to the polyhydroxy compound by either the polyacid or the epoxy reactants, or both.

Polyacids that are used to make the polyhydroxy compounds that have the desired long chain hydrocarbon groups are characterized as having hydrocarbon chains at least $C_6$ in length, preferably at least $C_8$ in length. Examples include adipic acid and dodecanedioic acid. Anhydrides may be used in place of the corresponding acid, where available. A plurality of hydrocarbon chains is also considered advantageous, and a particular type of polyacid of this type that has been found suitable is characterized by the structure:

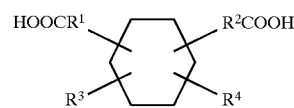

where $R^1$, $R^2$, $R^3$, and $R^4$ may be the same or different, $R^1$ and $R^2$ each contain alkylene groups at least $C_6$ in length (preferably at least $C_8$), and $R^3$ and $R^4$ each are H or an alkyl group. Preferably both of $R^3$ and $R^4$ are alkyl groups. In general, longer alkyl or alkylene groups provide greater hydrophobicity, which is desirable. Although no upper limit has been identified, alkylene groups longer than $C_{20}$ are uncommon. A commercial source of such acids are the so-called "dimer acids" and "trimer acids" sold under the name EMPOL® by the Henkel Corporation, Emery Group, Cincinnati, Ohio. These are produced by the polymerization of fatty acids, and the various EMPOL® products differ from each other in the relative proportions of dimer and trimer acids present, as well as monoacid impurity and amount of residual unsaturation remaining. The dimer acids are $C_{36}$ and the trimer acids are $C_{54}$. A particular example is EMPOL 1008, which is believed to contain a substantial fraction of 2-heptyl-3,4-bis(9-carboxyl nonyl)-1-pentyl-cyclohexane.

If polyepoxy reactants are used, monoacids may be used as the other reactant to make the polyhydroxy compounds of the present invention. Preferably, the larger organic monoacids are used for this purpose such as caproic, caprylic, capric, lauric myristic, palmitic, stearic, oleic, linoleic or linolenic acids.

Epoxy compounds for reacting with the polyacid to form the polyhydroxy compound may be selected from a broad range of known epoxy compounds. Since undue polymerization is preferably avoided when synthesizing the polyhydroxy compounds, the epoxy reactants are predominantly monoepoxies when polyacids comprise the other reactant. The smaller alkylene oxides, although not precluded, are not preferred so as to avoid handling gaseous reactants. Although it is not believed to be required, particularly when reacted with one of the acids having relatively high hydrocarbon content discussed above, using an epoxy that contributes additional hydrocarbon content is preferred. A particular monoepoxy product that is preferred because it is readily available and is relatively inexpensive is CARDURA E, the glycidyl ester of neodecanoic acid and propylene oxide commercially available from Shell Chemical Co. This example is particularly useful in that it contributes a terminal $C_9$ group to the polyhydroxy compound. Other commercially available monoepoxides having substantial hydrocarbon content are the epoxidized alpha olefins of the formula:

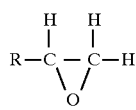

where R is hydrogen or an alkyl group having 1 to 26 carbon atoms. Preferably R is at least $C_6$. The polyhydroxy compounds are made by reacting an excess of the monoepoxy compound with the polyacid to yield a hydroxy functional ester compound. Polyepoxies such as the commercially available family of EPON products may be used, particularly if reacted with monoacids. Alternatively, polyepoxy compounds can be reacted with an excess of polyacid to limit molecular weight increase.

Alternatively, the long chain hydrocarbon group may be introduced into the vinyl polymer portion of the resin rather than the urethane portion. This may be accomplished by copolymerizing with the vinyl (acrylic) monomers the reaction product of an acid, an epoxy compound, and an epoxy acrylate, at least one of which includes the minimum hydrocarbon chain content discussed above. In preferred embodiments, a component with long chain hydrocarbon content is present in both the urethane and the acrylic portions of the resin. For this embodiment, the acids and epoxy compounds may be the same reactants discussed above. An example of an epoxy acrylate is glycidyl methacrylate.

Polyisocyanates that may be used in making the urethane prepolymer may be selected from a wide range of polyisocyanate compounds considered suitable for coating applications. These include aliphatic, cycloaliphatic, arylaliphatic or aromatic polyisocyanates. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. The isocyanate may also include mixtures of polyisocyanates.

Although polyhydroxy compounds synthesized from polyacids and epoxy compounds as described above type may theoretically be used as the major reactant for reacting with the polyisocyanate, practical considerations such as cost generally limit them to no more than 50 percent by weight of the isocyanate-reactive monomer content. Providing a second polyol also permits additional attributes to be imparted to the product. In the particular embodiments tested, the advantages of the present invention would not be expected to be significantly perceptible when the specialize polyhydroxy compounds are present in the monomer mixture in amounts less than about 20 percent by weight of the total polyol reactants. Significant improvements may be obtained when the polyhydroxy compound constitutes at least 25 percent of the polyol mixture, and optimum results may be obtained at levels of at least 30 percent. The remainder of the polyol mixture may constitute a second polyol of a more conventional type as described below.

The optional polyols reacted with the polyisocyanates to form the urethane prepolymer may be members of any of the chemical classes of polyols used or proposed to be used in polyurethane formulations. Low molecular weight diols could possibly be used, but it is preferred to use polymeric polyols for at least a portion of the polyol component for the sake of flexibility in the coating. Polymeric polyols having molecular weights in the range of 200–6000 are typical. In particular, the polyols may be polyesters, polyesteramides, polyethers, polythioethers, polycarbonates, polyacetals, polyolefins or polysiloxanes. Polyester polyols are particularly preferred and include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric, and adipic acids or their methyl esters, phthalic anhydride, or dimethyl terephthalate. Polyesters obtained by the polymerization of lactones, for example caprolactone, in conjunction with the polyol may also be used. Polyesteramides may be obtained by the inclusion of amino-alcohols such as ethanolamine in the polyesterification mixtures.

To provide for water dispersibility, the same monomers describe in Technique A above for this purpose may be used with Technique B as well.

The anionic, water-dispersible, isocyanate-terminated urethane prepolymer may be prepared in the conventional manner by reacting a stoichiometric excess of the polyisocyanates with the polyols under substantially anhydrous conditions at a temperature between about 30° C. and 130° C. until the reaction between the isocyanate groups and the hydroxyl groups is substantially complete. The polyisocyanate and the polyol components are suitably reacted in such proportions that the ratio of number of isocyanate groups to the number of hydroxyl groups is in the range from about 1.1:1 to about 6:1, preferably within the range of from 1.5:1 to 3:1. If desired, the well-known tin catalysts may be used to assist prepolymer formation.

Whether using synthesis technique A or B, the remainder of the steps are the same as described hereafter.

Before the prepolymer is dispersed in water, ammonia or a water soluble or dispersible amine is added to the mixture in an amount sufficient to substantially neutralize the carboxylic functionality as is well known in the art. The amine is added at about 65 to 120% amine equivalent per equivalent of carboxy functionality, preferably about 80% to 100%. Amines that may be used for neutralization are relatively volatile so that they may evaporate from the coating upon curing. Ammonia, or primary, secondary, or tertiary aliphatic, alicyclic, aromatic, araliphatic or heterocyclic amines may be used. Amines with hydroxy substituted alkyl groups may also be suitable. Examples of amines include diethylamine, diethanolamine, diisopropanolamine, 2-methyl-2-aminopropanol, triethylamine, dimethylethanolamine, methyldiethanolamine, and methyldiethylamine. The prepolymer/vinyl monomer mixture may be dispersed in water using techniques well known in the art. Preferably, the mixture is added to the water with agitation, or, alternatively, water may be stirred into the mixture.

A method for polymerizing the vinyl monomers involves adding the vinyl monomers to the previously formed polyurethane prepolymer, neutralizing the prepolymer, and then dispersing the prepolymer/monomer mixture in water. Polyurethane chain extender may be added at this time also. Thereafter, vinyl polymerization initiator is added and the temperature is increased to effect polymerization of the vinyl monomers.

A mixture of the water-dispersible polyurethane prepolymer and vinyl monomers is produced by adding a vinyl monomer composition to the prepolymer. Suitable vinyl monomers which may be combined with the prepolymer include ethylenically unsaturated hydrocarbons, esters and ethers, especially esters of acrylic and methacrylic acids. Specific examples include butadiene, isoprene, styrene, substituted styrenes, the lower alkyl ($C_1$–$C_6$) esters of acrylic, methacrylic and maleic acids, vinyl acetate, vinyl butyrate, acrylonitrile, vinylmethyl ether, vinylpropyl ether, vinylbutyl ether, vinyl chloride, vinylidene chloride, and the like. Polyethylenically unsaturated monomers include butadiene, isoprene, allylmethacrylate, diacrylate esters of $C_2$–$C_6$ diols such as butanediol diacrylate and hexanediol diacrylate, divinyl benzene, divinyl ether, divinyl sulfide, trimethylolpropane triacrylate and the like. The esters of acrylic and methacrylic acid are preferred, constituting at least 70 percent by weight of the vinyl monomer mixture in preferred embodiments, preferably at least 95 percent. It has been found that only limited amounts of styrene (including substituted styrenes) may be included in the vinyl monomer mixture. It is believed that this is due to the hydrophobic nature of styrene. Therefore, the styrene content of the vinyl monomer mixture is generally less than 50 weight percent, preferably less than 30 weight percent. Specific embodiments contain no styrene. On the other hand, it has been found to be desirable to include a relatively hydrophilic vinyl monomer in the vinyl monomer mixture, such as methyl methacrylate. In the most preferred embodiments of the invention, at least 50 weight percent of the vinyl monomer mixture constitutes methyl methacrylate.

Before the prepolymer/monomer mixture is dispersed in water, ammonia or a water soluble or dispersible amine is added to the mixture in an amount sufficient to substantially neutralize the carboxylic functionality as is well known in the art. The amine is added at about 65 to 120% amine equivalent per equivalent of carboxy functionality, preferably about 80% to 100%. Amines that may be used for neutralization are relatively volatile so that they may evaporate from the coating upon curing. Ammonia, or primary, secondary, or tertiary aliphatic, alicyclic, aromatic, araliphatic or heterocyclic amines may be used. Amines with hydroxy substituted alkyl groups may also be suitable. Examples of amines include diethylamine, diethanolamine, diisopropanolamine, 2-methyl-2-aminopropanol, triethylamine, dimethylethanolamine, methyldiethanolamine, and methyldiethylamine. The prepolymer/vinyl monomer mixture may be dispersed in water using techniques well known in the art. Preferably, the mixture is added to the water with agitation, or, alternatively, water may be stirred into the mixture.

The polyurethane prepolymer is chain extended by providing an active hydrogen-containing compound in the aqueous system. A feature of this invention is the selection of particular chain extending agents that yield branching of the polyurethane, which has been discovered to enhance metallic pigment orientation in coatings. The chain extenders of the present invention are aliphatic, alicyclic, aromatic, araliphatic or heterocyclic amines having at least three primary amine groups. A type of tri-primary amine compound found to be particularly advantageous for chain extending the polyurethane in the present invention are tri(aminoalkoxylated) triols such as trimethylolpropane poly(oxypropylene)triamine (molecular weight about 440) available from Texaco Chemical Co. under the name JEFFAMINE® T-403. The polyamines used as chain extenders in the present invention are free of tertiary amine groups in order to avoid discoloration of light colored coatings. Alternatively, the chain extender may be a triol such as trimethylolpropane {2-ethyl-2-(hydroxymethyl)-1,3-propanediol} and trimethylolethane {1,1,1-tris(hydroxymethyl)ethane}, or higher polyols such as pentaerythritol, di-pentaerythritol, and sugars A preferred triol is the reaction product of trimethylolpropane and ethylene oxide available under the name "TP-30" from Perstorp Chemicals. The ethylene oxide extended triols are preferred because they provide lower viscosity than the corresponding triols themselves. Also suitable are amines or polyols as described above having substitutions in the alkyl groups.

The amount of chain extender employed should be approximately equivalent to the free isocyanate groups in the prepolymer, the ratio of active hydrogens in the chain extender to isocyanate groups in the prepolymer preferably being in the range from 0.7 to 1.3:1. Of course when water is employed as the chain extender, these ratios will not be applicable since the water, functioning as both a chain extender and dispersing medium, will be present in a gross excess relative to the free isocyanate groups.

Free radical initiators that may be used for polymerization of the vinyl monomer component include: ammonium persulfate, hydrogen peroxide, t-butyl hydrogen peroxide, and other water-soluble initiators as are known in the art, particularly the azo-type initiators sold under the name VAZO by E. I. DuPont de Nemours & Co.

The chain extending reaction begins to proceed upon addition of the chain extender to the aqueous dispersion. Free radical polymerization of the monomer mixture begins when the temperature is elevated to a temperature sufficient to liberate free radicals at a rate that sustains the polymerization reaction. A typical temperature range is 30°–90° C., depending upon the particular reactants chosen.

The polymer dispersions obtained typically comprise 20 to 60 weight percent solids and may be employed as coating compositions and applied to any substrate including metals, plastics glass, wood, cloth, leather, paper, foam and the like by any conventional method including brushing, dipping, flow coating, spraying and the like. Generally, a coating of the aqueous composition is dried and cured at temperatures ranging from ambient to 150° C. for times ranging from 24 hours to 30 minutes. It is an advantage of the present invention that a cured coating can be obtained at relatively low temperature since no thermally activated crosslinking is required. This is advantageous for use on plastics and for refinish coating of automobiles. Alternatively, any of the thermally activated crosslinking agents commonly used for coatings, such as the many commercially available aminoplast resins (e.g., alkoxylated melamine derivatives) may be included in the coating compositions. These coating compositions of the present invention that include a crosslinking agent may be cured at elevated temperatures. Embodiments that include crosslinking agents are preferred for original automobile manufacturing applications. Other crosslinking mechanisms, such as the silane functionality required by U.S. Pat. No. 5,118,752 (Chang et al.), are not required in the present invention, and are preferably avoided in order to obtain the humidity resistance found in the coatings of the present invention. Accordingly, the polyurethane polymer of the present invention is preferably substantially free of silane groups.

In an alternative embodiment of the present invention, branching may be introduced into the polyurethane during synthesis of the polyurethane prepolymer prior to the chain extension step. In that case, the polyols reacted with the polyisocyanates are chosen to include a portion that include at least three hydroxyl groups, such as trimethylol propane and pentaerythritol and the other polyols disclosed above as chain extending agents. Triols were known in the prior art as possible monomers for synthesizing polyurethanes, but the prior art generally taught avoidance of triols or higher functional polyols because undesirable gelling could occur. It has now been discovered that minor amounts of polyols having at least three hydroxyl groups can be included in polyurethanes of the type described herein not only do not have a harmful effect, but surprising achieve improved pigment orientation.

An advantage of the present invention is improved orientation of metallic flake type pigments in coating compositions incorporating the polyurethane/acrylic resin disclosed herein. In order to achieve the preferred appearance of coatings containing reflective flake pigments, it is important that the plate-like pigment particles orient such that they are generally parallel to the substrate surface. This property is sometimes referred to as the "flip/flop" value of the coating. It is judged by the visual change in brightness or lightness of the metallic flake pigment with a change in viewing angle, that is, a change from 90 to 180 degrees. More specifically, it is generally desired that a surface having a metallic coating appear bright when viewed straight-on, but appear relatively dark when viewed at an angle. The greater the visual change from light to dark appearance, the better the "flip/flop." In the examples which follow, the flip/flop of several coatings were compared to each other.

THE EXAMPLES

Examples I and II employ Resin Synsthesis Technique A to produce a polyurethane/acrylate dispersion. Example I uses a tri-primary amine chain extender in accordance with the present invention, and Example II uses a diamine chain extender for comparative purposes. Example III is analogous to Example I except that, for the sake of comparison, no acrylic portion is included in the polyurethane dispersion. The products of Examples I, II, and III are incorporated into coating compositions in Examples XI to XIII. The performance of these coating compositions relative to each other may be seen in Table I.

Example I

This Example involves the preparation of an aqueous urethane/acrylic polymer dispersion in accordance with the present invention using a tri-primary amine (JEFFAMINE® T403) as follows:

| Feed | Ingredients | Parts by weight |
| --- | --- | --- |
| 1. | Methylene dicyclohexyl diisocyanate[1] | 187.4 |
| 2. | DDI diisocyanate[2] | 108.6 |
| 3. | FORMREZ 66-56[3] | 301.1 |
| 4. | Dibutyltin dilaurate | 0.5 |
| 5. | Dimethylol propionic acid | 46.5 |
| 6. | N-methyl pyrolidone | 141.6 |
| 7. | Methyl methacrylate | 251.1 |
| 8. | Butyl acrylate | 192.6 |
| 9. | Dimethylethanolamine | 30.9 |
| 10. | JEFFAMINE T-403[4] | 108.0 |
| 11. | Deionized water | 1741.3 |
| 12. | Ammonium persulfate | 1.6 |

[1]DESMODUR ® W from Bayer Corp., Pittsburgh, Pennsylvania.
[2]2-Heptyl-3,4-bis(9-isocyanato nonyl)-1-pentyl-cyclohexane from Henkel Corporation.
[3]Poly(1,6-hexanediol adipate), molecular weight about 2000, from Witco Corporation.
[4]JEFFAMINE ® T-403 triamine, molecular weight 440, available from Texaco Chemical Company.

Into a clean dry reactor equipped with heating, cooling, stirring and a nitrogen blanket were charged ingredients numbers 1 to 6. The reaction mixture was heated to 70° C. and held at this temperature for 2 hours. After this hold, ingredients numbers 7, 8, and 9 were added to the reaction product while cooling the reactor to 35° C. The polymer solution was then transferred into another reactor containing ingredients 10 and 11. The mixture was then passed through a MICROFLUIDIZER® model M110T emulsifier available from Microfluidics Corporation in Newton, Mass. The MICROFLUIDIZER® emulsifier is disclosed in U.S. Pat. No. 4,533,254. The device consists of a high pressure pump capable of producing up to 20,000 pounds per square inch (138,000 kPa) and an interaction chamber where the emulsification takes place. The pump forces the mixture of reactants in aqueous medium into the chamber where it is split into at least two streams which pass at very high velocity through at least two slits and collide resulting in the particulation of the mixture into small particles. The polymer product was passed through the emulsifier once at a pressure of 8000 pounds per square inch (55,200 kPA) to produce a microdispersion, and heated to 60° C. The ingredient number 12 was added and the solution was allowed to exotherm to about 82° C. The product thus formed had total solids of about 35%.

Example II (Comparative)

An aqueous urethane/acrylic polymer dispersion was prepared in the same manner as Example I, with the exception that JEFFAMINE T-403 was replaced by ethylene diamine on an amine equivalent basis.

Example III (Comparative)

An aqueous urethane polymer dispersion was prepared (without an acrylic portion as in Examples I and II) as follows:

| Feed | Ingredients | Parts by weight |
| --- | --- | --- |
| 1. | Methylene dicyclohexyl diisocyanate | 461.2 |
| 2. | Dimer diisocyanate (DDI) | 267.5 |
| 3. | FORMREZ 66-56 | 741.5 |
| 4. | Dibutyltin dilaurate | 1.3 |
| 5. | Dimethylol propionic acid | 114.8 |
| 6. | N-methyl pyrolidone | 361.1 |
| 7. | Triethylamine | 86.5 |
| 8. | JEFFAMINE T-403 | 244.9 |
| 9. | Deionized water | 4712.4 |

Into a clean dry reactor equipped with heating, cooling, stirring and a nitrogen blanket were charged ingredients numbers 1 to 6. The reaction mixture was heated to 82° C. and held at this temperature for 2 hours. After this hold, ingredients 7 was added to the reaction product while cooling the reactor to 35° C. The polymer solution was then transferred into another reactor containing ingredients 8 and 9. The mixture was then held at 40° C. for one hour. The product thus formed had total solids of about 25%.

Examples IV, IVa, and V are pigment paste compositions containing reflective metal flake pigment used in the coating compositions of Examples XI to

Example IV

An aluminum pigment-containing paste was prepared by mixing the following ingredients in a steel container at room temperature.

| Ingredients | Parts by weight |
| --- | --- |
| Ethylene glycol monohexyl ether | 360.0 |
| Diethylene glycol monobutyl ether | 121.2 |
| PPG 425[1] | 173.7 |
| CYMEL ® 322[2] | 208.7 |
| Aluminum flake pigment[3] | 280.0 |
| Phosphatized epoxy[4] | 120.0 |
| 50% aqueous dimethylethanolamine | 75.0 |
| Oligomeric ester[5] | 160.0 |

[1]Poly(propylene glycol), molecular weight approximately 425.
[2]Partially iminated melamine formaldehyde resin commercially available from CYTEC Industries, Inc.
[3]Aluminum flake pigment (untreated, average particle size 12 microns) commercially available from Toyo Aluminum under product code number PA-12-9948.
[4]Reaction product of 1 mole of phosphoric acid, 0.5 mole of parts EPON ® 828 (diglycidyl ether of bisphenol A available from Shell Oil and Chemical Co.), and 0.5 mole of phenyl glycidyl ether.
[5]Prepared according to U.S. Pat. No. 4,927,868, Example B, from methyl-hexahydrophthalic anhydride and 1-(3-hydroxy-2,2-dimethylpropyl)3-hydroxy-2,2-dimethylpropionate in methyl isobutyl ketone and ethanol in a weight ratio of 95:5.

Example IVa

An aluminum pigment-containing paste was prepared by mixing the following ingredients in a steel container at room temperature.

| Ingredients | Parts by weight |
| --- | --- |
| Ethylene glycol monohexyl ether | 228.1 |
| Diethylene glycol monobutyl ether | 76.8 |
| PPG 425[1] | 110.1 |
| CYMEL ® 322[2] | 132.3 |
| Aluminum flake pigment[3] | 177.4 |
| Phosphatized epoxy[4] | 76.0 |
| 50% aqueous dimethylethanolamine | 63.4 |
| Oligomeric ester[5] | 101.4 |

[1]Poly(propylene glycol), molecular weight approximately 425.
[2]Partially iminated melamine formaldehyde resin commercially available from CYTEC Industries, Inc.
[3]Aluminum flake pigment (untreated, average particle size 12 microns) commercially available from Toyo Aluminum under product code number PA-12-9948.
[4]Reaction product of 1 mole of phosphoric acid, 0.5 mole of parts EPON ® 828 (diglycidyl ether of bisphenol A available from Shell Oil and Chemical Co.), and 0.5 mole of phenyl glycidyl ether.
[5]Prepared according to U.S. Pat. No. 4,927,868, Example B, from methyl-hexahydrophthalic anhydride and 1-(3-hydroxy-2,2-dimethylpropyl)3-hydroxy-2,2-dimethylpropionate in methyl isobutyl ketone and ethanol in a weight ratio of 95:5.

Example V

An aluminum pigment-containing paste was prepared by mixing following ingredients in a steel container at room temperature.

| Ingredients | Parts by weight |
| --- | --- |
| Ethylene glycol monohexyl ether | 389.4 |
| Diethyleneglycol monobutyl ether | 131.1 |
| PPG 425[1] | 187.9 |
| TINUVIN 1130 | 47.3 |
| CYMEL ® 322[2] | 225.8 |
| Aluminum flake pigment[3] | 302.8 |
| Phosphatized epoxy[4] | 129.8 |
| 50% aqueous dimethylethanolamine | 108.2 |
| Oligomeric ester[5] | 173.0 |

[1]Poly(propylene glycol), molecular weight approximately 425.
[2]Partially iminated melamine formaldehyde resin commercially available from CYTEC Industries, Inc.
[3]Aluminum flake pigment (untreated, average particle size 12 microns) commercially available from Toyo Aluminum under product code number PA-12-9948.
[4]Reaction product of 1 mole of phosphoric acid, 0.5 mole of EPON ® 828 (diglycidyl ether of bisphenol A available from Shell Oil and Chemical Co.), and 0.5 mole of phenyl glycidyl ether.
[5]Prepared according to U.S. Pat. No. 4,927,868, Example B, from methyl-hexahydrophthalic anhydride and 1-(3-hydroxy-2,2-dimethylpropyl)3-hydroxy-2,2-dimethylpropionate in methyl isobutyl ketone and ethanol in a weight ratio of 95:5.

Examples VI to X describe making of polyurethane/acrylic dispersions by Resin Synthesis Technique B. Examples VI to VIII demonstrate the use of chain extenders in accordance with the present invention, and Example IX uses a comparative chain extender. Example X is an alternative embodiment of the present invention in which branching is attained in the prepolymer stage by use of a trifunctional monomer. The polymer dispersions of this groups of examples are incorporated into the coating compositions of Examples XIV to XVIII, the performance of which are shown in Table I.

Example VI

An aqueous polyurethane/acrylic polymer dispersion in accordance with the present invention was prepared using the ingredients as follows, including a tri-primary amine (JEFFAMINE T-403):

| Feed | Ingredients | Parts by weight |
|---|---|---|
| 1. | Methylene dicyclohexyl diisocyanate | 235.5 |
| 2. | EMPOL/CARDURA E adduct[1] | 98.3 |
| 3. | FORMREZ 66-56 | 203.2 |
| 4. | Dibutyltin dilaurate | 0.5 |
| 5. | Dimethylol propionic acid | 42.1 |
| 6. | N-methyl pyrolidone | 162.0 |
| 7. | Methyl methacrylate | 222.9 |
| 8. | Butyl acrylate | 128.8 |
| 9. | GMA/EMPOL/CARDURA E adduct[2] | 50.1 |
| 10. | Dimethylethanolamine | 28.0 |
| 11. | JEFFAMINE T-403[3] | 105.5 |
| 12. | Deionized water | 2123.5 |
| 13. | Ammonium persulfate | 1.5 |

[1]Reaction product of EMPOL 1008 (dimer acid, from Henkel Corporation) and CARDURA E (glycidol ester of neodecanoic acid, from Shell Chemical Co.). It is prepared by reacting 1 mole of EMPOL 1008 with 2 moles of CARDURA E at 120° C. using 1% (of total weight) of ethyl triphenyl phosphonium iodide as a catalyst.
[2]Reaction product of glycidol methacrylate, EMPOL 1008, and CARDURA E. It is prepared by reacting 1 mole of each of glycidol methacrylate, EMPOL 1008, and CARDURA E at 120° C.
[3]JEFFAMINE T-403 triamine, molecular weight 440, available from Texaco Chemical Company.

Into a clean dry reactor equipped with heating, cooling, stirring and a nitrogen blanket were charged ingredients numbers 1 to 6. The reaction mixture was heated to 82° C. and held at this temperature for 2 hours. After this hold, ingredients numbers 7, 8, 9, and 10 were added to the reaction product while cooling the reactor to 35° C. The polymer solution was then transferred into another reactor containing ingredients 11 and 12. The solution was then passed through the MICROFLUIDIZER at 8,000 psi pressure and heated to 60° C. Ingredient 13 was added, and the solution was allowed to exotherm to about 82°. The product thus formed had total solids of about 32%.

Example VII

A polyurethane/acrylic resin was prepared in the same manner as Example VI, with the exception that JEFFAMINE T-403 was replaced with trimethylol propane as the chain extender on an amine to hydroxyl equivalent basis.

Example VIII

A polyurethane/acrylic resin was prepared in the same manner as Example VI, with the exception that JEFFAMINE T-403 was replaced by pentaerythritol as the chain extender on an amine to hydroxyl equivalent basis.

Example IX (Comparative)

A polyurethane/acrylic resin was prepared in the same manner as Example VI, with the exception that JEFFAMINE T-403 was replaced by ethylenediamine as the chain extender on an amine equivalent basis.

Example X

In this example an aqueous urethane/acrylic polymer dispersion was prepared using a triol ("TP-30") in the prepolymer stage rather than in the chain extending step.

| Feed | Ingredients | Parts by weight |
|---|---|---|
| 1. | TP-30[1] | 10.3 |
| 2. | Methylene dicyclohexyl diisocyanate | 242.3 |
| 3. | EMPOL/CARDURA E adduct[2] | 101.1 |
| 4. | FORMREZ 66-56 | 209.1 |
| 5. | Dibutyltin dilaurate | 0.5 |
| 6. | Dimethylol propionic acid | 43.3 |
| 7. | N-methyl pyrolidone | 154.6 |
| 8. | Methyl methacrylate | 229.3 |
| 9. | Butyl acrylate | 132.5 |
| 10. | GMA/EMPOL/CARDURA E adduct[3] | 51.6 |
| 11. | Dimethylethanolamine | 28.8 |
| 12. | hydrazine monohydrate | 15.2 |
| 13. | Deionized water | 2025.6 |
| 14. | Ammonium persulfate | 1.5 |

[1]Reaction product of 1 mole of trimethylol propane and 3 moles of ethylene oxide, commercially available from Perstorp Polyols, Perstorp, Sweden.
[2]Reaction product of EMPOL 1008 (dimer acid, from Henkel Corporation) and CARDURA E (glycidol ester of neodecanoic acid, from Shell Chemical Co.). It is prepared by reacting 1 mole of EMPOL 1008 with 2 moles of CARDURA E at 120° C. using 1% (of total weight) of ethyl triphenyl phosphonium iodide as a catalyst.
[3]Reaction product of glycidol methacrylate, EMPOL 1008, and CARDURA E. It is prepared by reacting 1 mole of each of glycidol methacrylate, EMPOL 1008, and CARDURA E at 120° C.

Into a clean dry reactor equipped with heating, cooling, stirring and a nitrogen blanket were charged ingredients 1 to 7. The reaction mixture was heated to 82° C. and held at this temperature for 2 hours. After this hold, ingredients 8, 9, and 11 were added to the reaction product while cooling the reactor to 35° C. The polymer solution was then transferred into another reactor containing ingredients 12 and 13. The solution was then passed through the MICROFLUIDIZER at 8,000 psi pressure, and heated to 60° C. Ingredient 14 was added, and the solution was allowed to exotherm to about 82° C. The product thus formed had total solids of about 32%.

The following Examples XI to XVIII are coating compositions prepared from each of the polymer dispersions described in Examples I to III and VI to X.

Example XI

A coating composition in accordance with the present invention was prepared using the following ingredients, including the polymer dispersion of Example I (chain extended with tri-primary amine):

| Ingredients | Parts by weight |
|---|---|
| Aluminum paste of Example IV | 155.9 |
| Polyurethane/acrylic latex[1] | 139.3 |
| Polymer of Example I | 53.6 |
| Mineral spirits | 10.4 |
| Deionized water | 122.7 |
| 50% aqueous dimethylethanol solution | 3.0 |

[1]Made in accordance with Example II, Part A, in U.S. Pat. No. 5,071,904 (Martin et al.).

The coating composition was prepared by slowly adding each of the materials in sequence to a mixing vessel under moderate agitation with a paddle blade, with 5 minutes of mixing between additions.

Example XII (COMPARATIVE)

A coating composition was prepared by combining together, in the same manner as in Example XI, the following ingredients, including the polymer dispersion of Example II (chain extended with diamine):

| Ingredients | Parts by weight |
| --- | --- |
| Aluminum paste of Example IVa | 137.9 |
| Polyurethane/acrylic latex[1] | 117.9 |
| Polymer of Example II | 54.4 |
| Mineral spirit | 8.8 |
| Deionized water | 57.4 |
| 50% aqueous dimethylethanol solution | 3.0 |

[1]Made in accordance with Example II, Part A, in U.S. Pat. No. 5,071,904 (Martin et al.).

Example XIII (Comparative)

A coating composition was prepared by combining together, in the same manner as in Example XI, the following ingredients, including the polymer dispersion of Example III (having no acrylic portion):

| Ingredients | Parts by weight |
| --- | --- |
| Aluminum paste of Example V | 123.6 |
| Polyurethane/acrylic latex[1] | 105.7 |
| Polymer of Example III | 60.4 |
| Mineral spirit | 7.9 |
| Deionized water | 47.6 |
| 50% aqueous dimethylethanolamine | 2.3 |

[1]Made in accordance with Example II, Part A, in U.S. Pat. No. 5,071,904 (Martin et al.).

Example XIV

A coating composition was prepared by combining together, in the same manner as in Example XI, the following ingredients, including the polymer dispersion of Example VI (chain extended with tri-primary amine):

| Ingredients | Parts by weight |
| --- | --- |
| Aluminum paste of Example V | 162.9 |
| Polyurethane/acrylic latex[1] | 139.3 |
| Polymer of Example VI | 64.4 |
| Mineral spirits | 10.4 |
| Deionized water | 80.5 |
| 50% aqueous dimethylethanol solution | 3.0 |

[1]Made in accordance with Example II, Part A, in U.S. Pat. No. 5,071,904 (Martin et al.).

Example XV

A coating composition was prepared by combining together, in the same manner as in Example XI, the following ingredients, including the polymer dispersion of Example VII (chain extended with triol):

| Ingredients | Parts by weight |
| --- | --- |
| Aluminum paste of Example V | 162.9 |
| Polyurethane/acrylic latex[1] | 139.3 |
| Polymer of Example VII | 68.1 |
| Mineral spirits | 10.4 |
| Deionized water | 70.3 |
| 50% aqueous dimethylethanol solution | 3.0 |

[1]Made in accordance with Example II, Part A, in U.S. Pat. No. 5,071,904 (Martin et al.).

Example XVI

A coating composition was prepared by combining together, in the same manner as in Example XI, the following ingredients, including the polymer dispersion of Example VIII (chain extended with pentaerythritol):

| Ingredients | Parts by weight |
| --- | --- |
| Aluminum paste of Example V | 162.9 |
| Polyurethane/acrylic latex[1] | 139.3 |
| Polymer of Example VIII | 66.5 |
| Mineral spirits | 10.4 |
| Deionized water | 75.4 |
| 50% aqueous dimethylethanolamine | 3.0 |

[1]Made in accordance with Example II, Part A, in U.S. Pat. No. 5,071,904 (Martin et al.).

Example XVII (Comparative)

A coating composition was prepared that was the same as Example XVI, with the exception that the polymer dispersion of Example VIII was replaced with the polymer dispersion of Example IX (chain extended with diamine).

Example XVIII

A coating composition was prepared that was the same as Example XVI, with the exception that the polymer dispersion of Example VIII was replaced with the polymer dispersion of Example X (triol in the prepolymer).

Each of the coating formulations of Examples XI to XVIII was tested for performance by application onto a substrate prepared as follows. The substrates were 32 gauge steel panels precoated with electrocoat and primer (available from Advanced Coating Technologies, Inc., Hillsdale, Mich., as APR24711). Each of the base coat compositions was applied by air-atomized spray over these substrates. The base coated substrates were prebaked at 180° F. for 10 minutes. Subsequently, a two component clear top coat (available from BASF Company), based on isocyanate/hydroxyl reaction chemistry, was spray applied to the prebaked basecoat. The clear coat was air flashed for 10 minutes, then baked at 293° F. (145° C.) for 30 minutes.

Evaluation of gloss and DOI (distinctness of image) of the coated substrates as described above was performed following 48 hours of air-drying at ambient conditions, and was performed again following a subsequent exposure for 4 days at 140° F. (60° C.) and 100% relative humidity. The gloss and DOI tests were performed no later than 5 minutes after removal of the panels from the humidity exposure. The results are set forth in Table I.

Gloss measurements of each coated panel were made using a Gardner Glossgard IIa 20 degree glossmeter (available from Pacific Scientific, Gardner/Neotec Instrument Division, Silver Spring, Md.). Results are in terms of percentage of light reflected, whereby a higher number indicates higher gloss.

DOI measurements of each coated panel were made using a Dori-Gon II DOI meter available from Hunter Associates Laboratory.

The measurement of pigment orientation ("flip/flop") was performed using an Alcope LMR-200 Laser Multiple Reflectometer. The values were measured by placing the LMR-200 laser unit on each test panel, and measuring reflected light at a 90 degree angle (perpendicular) to the plane of the coated surface and at a 45 degree angle to the plane of the coated surface. The flip/flop value recorded is the ratio of the 90 degree reflectance to the 45 degree reflectance. Higher values are desired.

The performance properties of the coatings described in the foregoing examples are set forth in Table I.

| Coating Example | Initial Gloss | Initial DOI | 140° F. 4 Days Gloss | 140° F. 4 Days DOI | Flip/Flop |
|---|---|---|---|---|---|
| Example XI | 87 | 90 | 86 | 72 | 1.78 |
| Example XII (Comparative) | 80 | 88 | 83 | 75 | 1.67 |
| Example XIII (Comparative) | 94 | | 79 | | 1.55 |
| Example XIV | 91 | 87 | 87 | | 1.72 |
| Exarnple XV | 91 | 88 | 85 | | 1.72 |
| Example XVI | 89 | 90 | 80 | | 1.71 |
| Example XVII (Comparative) | 90 | 90 | 86 | | 1.64 |
| Example XVIII | 91 | 84 | 85 | | 1.70 |

Although certain embodiments of the invention have been described in detail for the purpose of illustrating the best mode of the invention, it is to be understood that such detail is solely for that purpose and that variations can be made by those skilled in the art without departing from the spirit and scope of the invention as defined by the claims.

We claim:

1. A water reducible polyurethane-acrylic resin which comprises:
   (a) 20–90 percent by weight of a polyurethane selected from the group consisting of:
      (A) the reaction product of:
         (i) a first polyisocyanate having a linear carbon chain greater than $C_6$ in length between two isocyanate groups;
         (ii) a second isocyanate different from he first polyisocyanate;
         (iii) a polyol for reaction with the isocyanates to form polyurethane; and
         (iv) a monomer having an anionic group and functionality reactive with isocyanate to provide water dispersibility for the polyurethane through salt formation and as such different from the polyol of (iii); and
      (B) the reaction product of:
         (v) a polyisocyanate;
         (vi) a polyhydroxy compound which is the reaction product of at least one monomer having a hydrocarbon group of at least six carbon atoms, where the polyhydroxy compound reacts with the polyisocyanate to form polyurethane; and
         (vii) a monomer having an anionic group and functionality reactive with isocyanate to provide water dispersibility for the polyurethane through salt formation and as such different from the polyhydroxy compound of (vi);
   the polyurethane (a) being further chain extended by reaction in water with a chain extending compound having at least three hydroxyl groups or at least three primary amine groups and being substantially free of tertiary amine groups to avoid discoloration in a coating composition having water reducible polyurethane-acrylic resin, whereby a branched polyurethane structure for (a) results from the chain extension; and
   (b) 10–80 percent by weight of the free radical polymerization product of a mixture of vinyl monomers polymerized in the presence of the branched polyurethane of (a);
   wherein the weight percentages are based on the total resin solids content of (a) plus (b).

2. The resin of claim 1 wherein the chain extending compound contains at least three primary amine groups.

3. The resin of claim 2 wherein the chain extending compound is a tri(aminoalkoxylated)triol.

4. The resin of claim 3 wherein the chain extending compound is trimethylolpropane poly(oxypropylene) triamine.

5. The resin of claim 1 wherein the chain extending compound is a polyol having at least three hydroxyl groups.

6. The resin of claim 5 wherein the chain extending compound is the polyol reaction product of trimethylolpropane and ethylene oxide.

7. The resin of claim 1 wherein the polyurethane (a) is type (A) and is the reaction product of:
   (i) 8–25 percent by weight of said first polyisocyanate;
   (ii) 15–50 percent by weight of said second isocyanate;
   (iii) 25–70 percent by weight of said polyol; and
   (iv) 1–10 percent by weight of said monomer having an anionic group and functionality reactive with isocyanate;
   the weight percentages based on total resin solids weight of the polyurethane reactants.

8. The resin of claim 7 wherein the polyurethane (a) is the reaction product of:
   (i) 10–20 percent by weight of said first polyisocyanate;
   (ii) 20–40 percent by weight of said second isocyanate;
   (iii) 40–60 percent by weight of said polyol; and
   (iv) 5–10 percent by weight of said monomer having an anionic group and functionality reactive with isocyanate;
   the weight percentages based on total resin solids weight of the polyurethane reactants.

9. The resin of claim 1 wherein the polyurethane (a) is type (B) and is the reaction product of:
   (i) 10–70 percent by weight of said polyisocyanate;
   (ii) 25–70 percent by weight of said polyol; and
   (iii) 1–10 percent by weight of said monomer having an anionic group and functionality reactive with isocyanate;
   the weight percentages based on total resin solids weight of the polyurethane reactants.

10. The resin of claim 9 wherein the polyurethane is the reaction product of:
    (i) 20–60 percent by weight of said polyisocyanate;
    (ii) 25–60 percent by weight of said polyol; and
    (iii) 5–10 percent by weight of said monomer having an anionic group and functionality reactive with isocyanate;
    the weight percentages based on total resin solids weight of the polyurethane reactants.

11. The resin of claim 1 wherein the free radical polymerization product (b) is the reaction product of a vinyl monomer combination comprising:
    50–100 weight percent esters of acrylic acid or methacrylic acid; and
    0 to less than 50 weight percent styrene;
    the weight percentages based on total resin solids weight of the vinyl monomer reactants.

12. The resin of claim 11 where the vinyl monomers include methyl methacrylate and another acrylate.

13. The resin of claim 12 where the vinyl monomers include styrene in less than 30 weight percent of the vinyl monomer mixture.

14. An aqueous coating composition comprising:
    aqueous medium;

reflective flake pigment;

a film-forming resin comprising a water reducible polyurethane-acrylic resin which comprises:

(a) 20–90 percent by weight of a polyurethane selected from the group consisting of:
  (A) the reaction product of:
    (i) a first polyisocyanate having a linear carbon chain greater than $C_6$ in length between two isocyanate groups;
    (ii) a second isocyanate different from the first polyisocyanate;
    (iii) a polyol for reaction with the isocyanates to form polyurethane; and
    (iv) a monomer having an anionic group and functionality reactive with isocyanate to provide water dispersibility for the polyurethane through salt formation and as such different from the polyol of (iii); and
  (B) the reaction product of:
    (v) a polyisocyanate;
    (vi) a polyhydroxy compound which is the reaction product of at least one monomer which includes a hydrocarbon group of at least six carbon atoms, where the polyhydroxy compound reacts with the polyisocyanate to form polyurethane; and
    (vii) a monomer having an anionic group and functionality reactive with isocyanate to provide water dispersibility for the polyurethane through salt formation and as such different from the polyhydroxy compound of (vi);

the polyurethane (a) being further chain extended by reaction in water with a compound having at least three hydroxyl groups or at least three primary amine groups and being substantially free of tertiary amine groups to avoid discoloration of the coating composition whereby a branched polyurethane structure for (a) results from the chain extension; and (b) 10–80 percent by weight of the free radical polymerization product of a mixture of vinyl monomers polymerized in the presence of the branched polyurethane of (a);

wherein the weight percentages are based on the total resin solids content of (a) plus (b).

15. The coating composition of claim 14 wherein the pigment comprises metallic flakes.

16. The coating composition of claim 14 wherein the polyurethane (a) is present in an amount of 50–90 percent by weight, and the free radical polymerized product (b) is present in an amount of 10–50 percent by weight, based on total solids content of (a) and (b).

17. Aqueous coating composition of claim 14 which includes a crosslinking agent to cure the coating at elevated temperatures.

18. An aqueous coating composition comprising:

aqueous medium;

reflective flake pigment;

a film-forming resin comprising a water reducible polyurethane-acrylic resin which comprises:

(a) 20–90 percent by weight of a polyurethane selected from the group consisting of:
  (A) the reaction product of:
    (i) a first polyisocyanate having a linear carbon chain greater than $C_6$ in length between two isocyanate groups;
    (ii) a second isocyanate different from the first polyisocyanate;
    (iii) a polyol comprising a combination of diols and polyols having at least three hydroxyl groups for reaction with the isocyanates to form polyurethane; and
    (iv) a monomer having an anionic group and functionality reactive with isocyanate to provide water dispersibility for the polyurethane through salt formation and as such different from the polyol of (iii); and
  (B) the reaction product of:
    (v) a polyisocyanate;
    (vi) a polyhydroxy compound which is the reaction product of an acid and a material selected from the group consisting of epoxy and polyol wherein at least one monomer includes a hydrocarbon group of at least six carbon atoms;
    (vii) a combination of diols and polyols having at least three hydroxyl groups and as such different from (vi) and (viii); and
    (viii) a monomer having an anionic group and functionality reactive with isocyanate to provide water dispersibility for the polyurethane through salt formation and as such different from the polyhydroxy compound of (vi);

the polyurethane (a) having a branched structure from the formation of reaction products A or B or through chain extension with a polyamine having at least three primary amine groups or a polyol having at least three hydroxyl groups; and (b) 10–80 percent by weight of the free radical polymerization product of a mixture of vinyl monomers polymerized in the presence of the branched polyurethane of (a);

wherein the weight percentages are based on the total resin solids content of (a) plus (b).

19. The coating composition of claim 18 wherein the pigment comprises metallic flakes.

* * * * *